United States Patent
Suzuka

(10) Patent No.: US 7,177,530 B1
(45) Date of Patent: Feb. 13, 2007

(54) RECORDING/REPRODUCING APPARATUS

(75) Inventor: Tetsuya Suzuka, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1135 days.

(21) Appl. No.: 09/830,674

(22) PCT Filed: Aug. 29, 2000

(86) PCT No.: PCT/JP00/05806

§ 371 (c)(1),
(2), (4) Date: Jul. 31, 2001

(87) PCT Pub. No.: WO01/16952

PCT Pub. Date: Mar. 8, 2001

(30) Foreign Application Priority Data

Aug. 30, 1999 (JP) .................................. 11-243617

(51) Int. Cl.
H04N 7/26 (2006.01)
H04N 5/00 (2006.01)
H04N 5/91 (2006.01)
G11B 5/09 (2006.01)

(52) U.S. Cl. ........................ 386/124; 386/46; 386/72; 386/82; 386/125; 369/47.1

(58) Field of Classification Search ................... 386/35, 386/45–46, 68, 72, 82, 91, 92, 109, 112, 124, 386/125, 126; 369/32, 47, 59; 360/13, 55
See application file for complete search history.

(56) References Cited

U.S. PATENT DOCUMENTS 5,355,486 A * 10/1994 Cornaby ..................... 718/102
5,420,839 A 5/1995 Tateishi
6,240,244 B1 * 5/2001 Ikeda ......................... 386/125
6,553,476 B1 4/2003 Ayaki et al.

FOREIGN PATENT DOCUMENTS

| JP | 5-101613 | 4/1993 |
|----|----------|--------|
| JP | 5-205270 | 8/1993 |
| JP | 6-12773 | 1/1994 |
| JP | 7-191894 | 7/1995 |
| JP | 7-336639 | 12/1995 |
| JP | 8-63877 | 3/1996 |
| JP | 9-270984 | 10/1997 |
| JP | 9-319523 | 12/1997 |
| JP | 10-171713 | 6/1998 |
| JP | 10-333984 | 12/1998 |

* cited by examiner

Primary Examiner—Thai Q. Tran
Assistant Examiner—Mishawn Dunn
(74) Attorney, Agent, or Firm—Wenderoth, Lind & Ponack, L.L.P.

(57) ABSTRACT

An independent internal buffer area is provided for each of plural kinds of accesses to a hard disk, and each internal buffer is used for the corresponding access, whereby that access by a processor and access by a video processing unit share an internal buffer is avoided, and the continuity of the accesses to the hard disk for recording and reproduction can be secured. Further, since an internal buffer to be used is specified for each access to a file, the processor can randomly access a file in which video data has already been recorded or a file in which video data is being recorded.

6 Claims, 9 Drawing Sheets

Fig.5 format of command

| command name | first argument | second argument | third argument | return value |
|---|---|---|---|---|
| OPEN | file name (511) | open mode (512) | internal buffer to be used (513) | file identifier (514) |
| READ | file identifier (514) | destination address (522) | transfer size (523) | read size (524) |
| WRITE | file identifier (514) | destination address (532) | transfer size (533) | read size (534) |
| LSEEK | file identifier (514) | file pointer value (542) | — | updated pointer value (544) |
| CLOSE | file identifier (514) | — | — | — |

510 — OPEN row
520 — READ row
530 — WRITE row
540 — LSEEK row
550 — CLOSE row

RECORDING/REPRODUCING APPARATUS

TECHNICAL FIELD

The present invention relates to a recording and reproduction apparatus for recording data on a hard disk, or reproducing and editing data on the hard disk and, more particularly, to a recording and reproduction apparatus having a file system for controlling recording and reproduction to a hard disk.

BACKGROUND OF THE INVENTION

In recent years, there has been developed a recording and reproduction apparatus for recording and reproducing a high-bit-rate and continuous digital signal, such as a video signal, besides burst data whose fundamental size is small, such as a document or the like.

The above-mentioned recording and reproduction apparatus comprises a processor for controlling the operation of the entire apparatus, a main memory as a work recording unit for the processor, a hard disk as a secondary recording unit, a file system for executing data transfer between the main memory and the hard disk, and a video processing unit for terminating a video input and restoring a video output. The recording and reproduction apparatus records digital video on the hard disk, reproduces the digital video from the hard disk and, further, performs editing of the digital video recorded on the hard disk.

Further, ordinary data and video data exist in the hard disk of the recording and reproduction apparatus. The ordinary data is data to be processed by the processor, and it has the burst transfer characteristics. On the other hand, the video data is data to be processed by the video processing unit, and it has the continuous transfer characteristics.

Hereinafter, the conventional recording and reproduction apparatus will be described taking examples.

PRIOR ART 1

FIG. 2 is a block diagram illustrating a recording and reproduction apparatus according to Prior Art 1, which is described in, for example, Chapter 5 "File System" (p. 297~p. 386) of "MINIX Operating System" (supervised by Bun Sakamoto, Apr. 21, 1989, ASKII). In the figure, 101 denotes a processor for controlling the operation of the entire apparatus, 102 denotes a main memory as a working recording circuit for the processor 101, 103 denotes a hard disk as a data recording circuit, 104 denotes a file system for controlling data transfer between the main memory 102 and the hard disk 103 or between a video processing unit 105 and the hard disk 103, and 105 denotes a video processing unit for terminating a video input and restoring a video output. Further, 11 denotes a file management unit for executing the procedure to manage a file, 12-1 denotes an HDD cache as an internal buffer of the file system 104, 12-2 denotes a recording data FIFO for holding recording data, 12-3 denotes a reproduction data FIFO for holding reproduction data, 13 denotes an HDD transfer control unit for executing data transfer, 15 denotes a reception termination unit for converting a video input into an internal recording format, and 16 denotes a decoder for creating a video output from the data recorded on the hard disk 103. Further, the file system 104 is a file system managed by an operating system of a computer device 100, which is used as it is in the recording and reproduction apparatus.

In Prior Art 1, transfer of the ordinary data between the hard disk 103 and the main memory 102, and transfer of the video data between the hard disk 103 and the video processing unit 105 are executed only through the HDD cache 12-1 which is a common internal buffer in the file system 104.

PRIOR ART 2

FIG. 3 is a block diagram illustrating a recording and reproduction apparatus according to Prior Art 2, which is disclosed in Japanese Published Patent Application No. Hei. 9-319523. Hereinafter, Prior Art 2 will be described with particular emphasis on a hard disk 103 and a file system 104 which are different from those of Prior Art 1. In FIG. 3, the recording and reproduction apparatus of Prior Art 2 comprises a first file system 104-1 for transferring ordinary data, and having a random-accessible HDD cache 12-1 as an internal buffer; and a second file system 104-2 for transferring video data, and having a recording data FIFO 12-2 for holding recording data and a reproduction data FIFO 12-3 for holding reproduction data. The hard disk 103 is managed as two independent areas, i.e., an ordinary data recording section 103-1 and a video data recording section 103-2. Since the constituents with the same reference numerals as those of Prior Art 1 shown in FIG. 2 operate in the same manner as described with respect to FIG. 2, repeated description is not necessary.

In Prior Art 2, access to the ordinary data recording section 103-1 of the hard disk 103 by the processor 101, and access to the video data recording section 103-2 of the hard disk 103 by the video processing unit 105 are controlled independently from each other. That is, an internal buffer to be used is fixed for each file type, and the HDD cache 12-1 is used for the data in the ordinary data recording section 103-1, and the recording data FIFO 12-2 or the reproduction data FIFO 12-3 is used for the data in the video data recording section 103-2.

PROBLEMS TO BE SOLVED BY THE INVENTION

In a recording and reproduction apparatus, when recording or reproducing ordinary data in/from a hard disk, it is necessary to make burst and random access to data smaller than several kilobytes, and when recording or reproducing video data in/from a hard disk, it is necessary to make continuous access at a transfer rate of several megabits/sec. In the conventional recording and reproduction apparatus, however, it is difficult to reconcile the random access and the continuous access.

Hereinafter, the problems of Prior Art 1 and Prior Art 2 will be described in detail.

PROBLEM OF PRIOR ART 1

In the recording and reproduction apparatus shown in FIG. 2, since the ordinary data and the video data are transmitted through only the HDD cache 12 in the common file system 104, the transmission of the video data is affected by the transmission of the ordinary data. Even when the hard disk 103 has sufficient data transmission ability, if the ratio of the ordinary data to the HDD cache 12 in the system file is increased, the hard disk 103 cannot transmit the video data at a predetermined rate. Accordingly, in the file system 104 shown in FIG. 2, the larger the data size becomes, the larger the access delay to the file system 104 grows, leading to difficulty in securing continuity of recorded or reproduced video data.

PROBLEM OF PRIOR ART 2

On the other hand, the recording and reproduction apparatus shown in FIG. 3 has the two independent file systems 104-1 and 104-2 for the ordinary data and the video data recorded on the hard disk 103, respectively, and fixedly uses the HDD cache 12-1 for reading and writing the ordinary data, the recording data FIFO 12-2 for recording the video data, and the reproduction data FIFO 12-3 for reproducing the video data. Therefore, access to the ordinary data and access to the video data can be executed independently, whereby access delay to the file system 104 is prevented, and continuous accessibility to the video data to be recorded or reproduced is assured.

In the recording and reproduction apparatus shown in FIG. 3, however, the hard disk 103 is managed as two independent areas, i.e., the ordinary data recording section 103-1 and the video data recording section 103-2. Therefore, the processor 101 cannot make random access to the video data recording section 103-2 in the hard disk 103.

The random access to the video data by the processor 101 is required to realize the function of automatically creating a thumbnail image to a recorded program, the function of editing the image, or the like. In the construction shown in FIG. 3, however, it is impossible to automatically create a thumbnail image to a recorded program or edit the image by random access of the processor 101 to the video data on the hard disk 103.

The present invention is made to solve the above-mentioned problems and has for its object to provide a recording and reproduction apparatus that can realize high-speed and continuous access to video data for recording and reproducing a digital video signal, and random access to video data for editing or the like.

SUMMARY OF THE INVENTION

A recording and reproduction apparatus according to a first aspect of the present invention is a recording and reproduction apparatus comprising a hard disk for holding data, a file system for controlling recording of data into the hard disk and reproduction of data from the hard disk, and plural processors for accessing the data in the hard disk, wherein the file system includes internal buffers for temporarily holding the data transferred between the plural processors and the hard disk, for every access executed between the plural processors and the hard disk.

Therefore, the file system has an internal buffer for each of the accesses executed by the respective processors, whereby that the accesses from the plural processors share an internal buffer is avoided. So, even when there are plural kinds of accesses from the plural processors to the hard disk, the continuity of the accesses can be secured, and another processor can make random access to a file where data has already been recorded or a file where data is being recorded.

Next, a recording and reproduction apparatus according to a second aspect of the present invention is a recording and reproduction apparatus as defined in the first aspect, wherein each of the accesses executed between the plural processors and the hard disk is any of sequential or random read access, write access, and read/write access.

Therefore, the file system has an internal buffer for each of the accesses executed by the respective processors, whereby that the accesses from the plural processors share an internal buffer is avoided. So, even when there are plural kinds of accesses from the plural processors to the hard disk, the continuity of the accesses can be secured, and another processor can make random access to a file where data has already been recorded or a file where data is being recorded.

Next, a recording and reproduction apparatus according to a third aspect of the present invention is a recording and reproduction apparatus as defined in the first aspect, wherein the processors are: a recording unit for generating digital video to be recorded, and performing sequential write access to the hard disk; a reproduction unit for performing sequential read access to the hard disk, and restoring the digital video from the recorded data; and a processor for controlling the entire recording and reproduction apparatus, and performing random read/write access to the hard disk.

Therefore, the file system has an internal buffer for each of the accesses executed by the recording unit, the reproduction unit, and the processor, whereby that the accesses from the recording unit, the reproduction unit, and the processor share an internal buffer is avoided. So, the access to ordinary data by the processor does not adversely affect the accesses to video data by the recording unit and the reproduction unit, whereby the continuity of the accesses to the video data is secured, and the processor can make random access to a file where video data has already been recorded or a file where video data is being recorded.

Next, a recording and reproduction apparatus according to a fourth aspect of the present invention is a recording and reproduction apparatus as defined in any of the first to third aspects of the present invention, wherein the file system includes a selector for selecting an internal buffer to be used for each access, in advance of use of the hard disk.

Therefore, the file system can select an internal buffer that is provided for each of the accesses executed by the respective processors, whereby that the accesses from the plural processors share an internal buffer is avoided. So, even when there are plural kinds of accesses from the plural processors to the hard disk, the continuity of the accesses can be secured. Further, since an internal buffer to be used is not fixed for each file, but is selected in advance of use of the hard disk, another processor can make random access to a file where data has already been recorded or a file where data is being recorded.

BRIEF DESCRIPTION OF THE DRAWINGS

FIG. 5 is a diagram illustrating a command format from a processor of the recording and reproduction apparatus according to the first embodiment of the invention.

DETAILED DESCRIPTION OF THE INVENTION

Embodiment 1

Hereinafter, a recording and reproduction apparatus according to a first embodiment of the present invention will be described with reference to the drawings.

Figure 1:
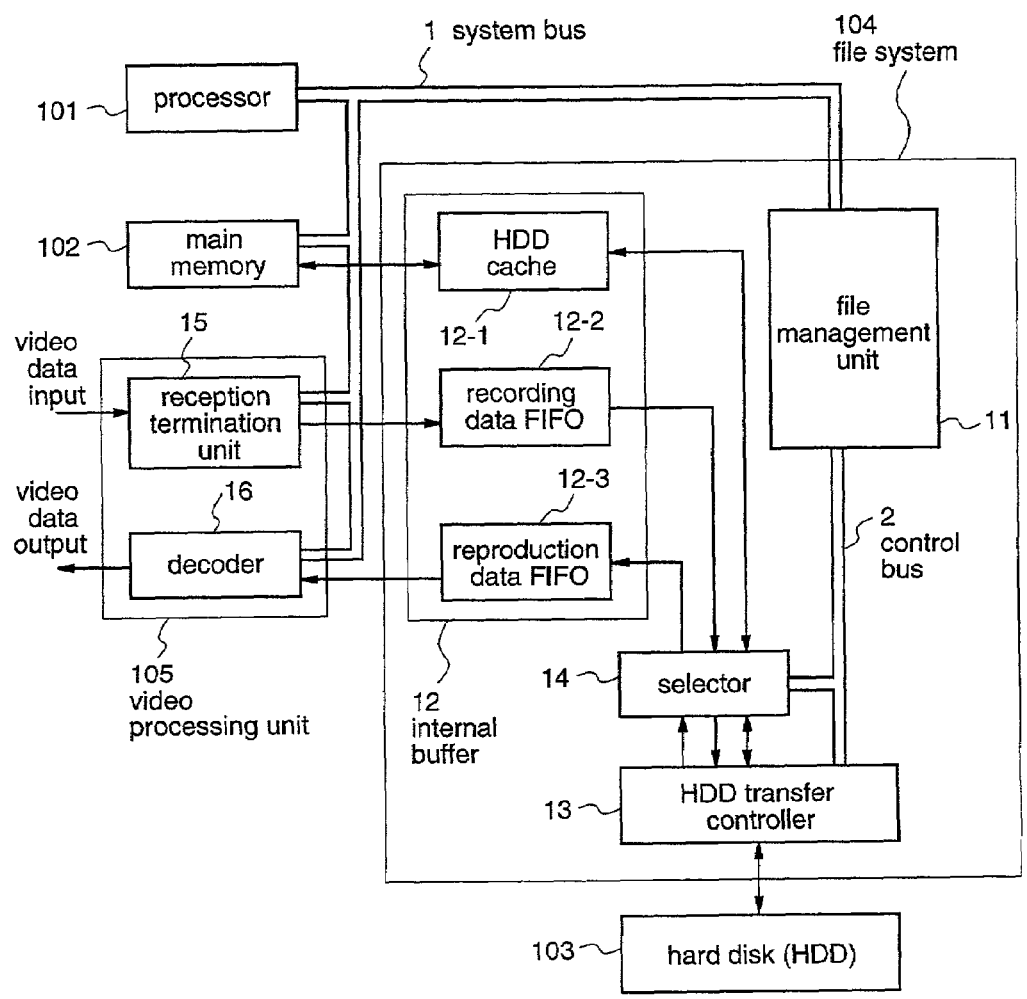
FIG. 1 is a block diagram of a recording and reproduction apparatus according to a first embodiment of the present invention.
Figure 2:
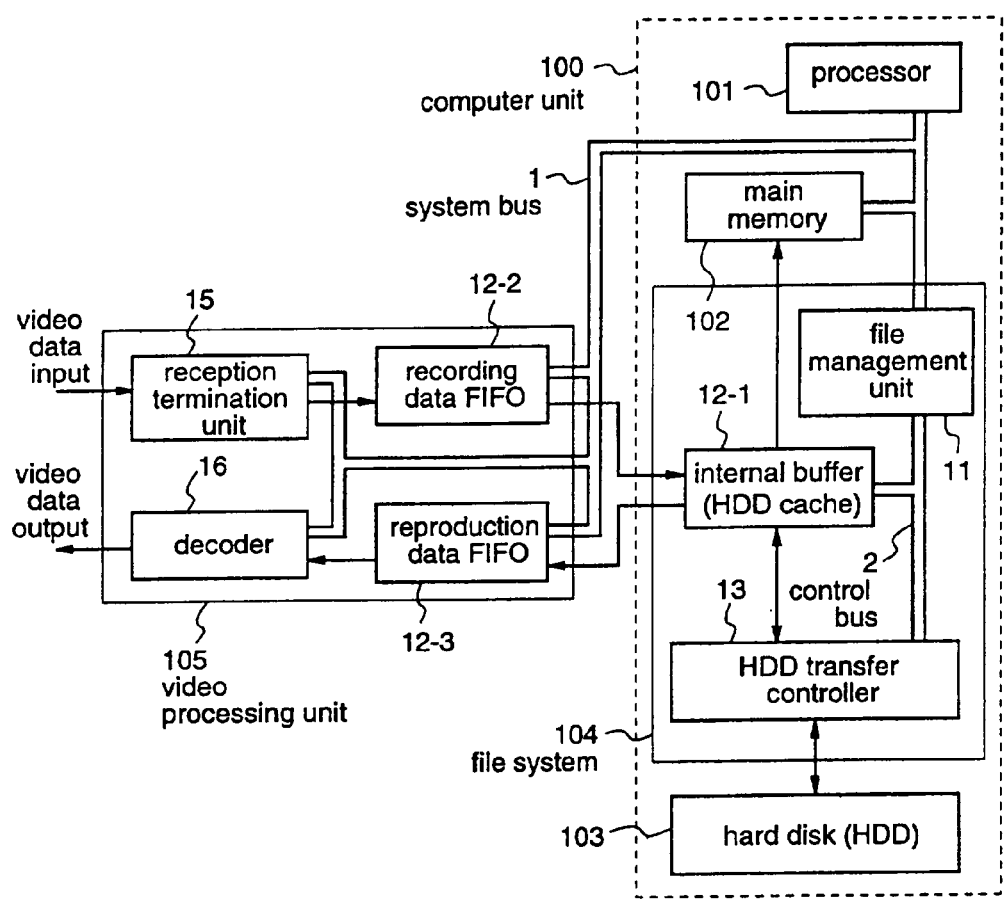
FIG. 2 is a block diagram of a recording and reproduction apparatus according to Prior Art 1.
Figure 3:
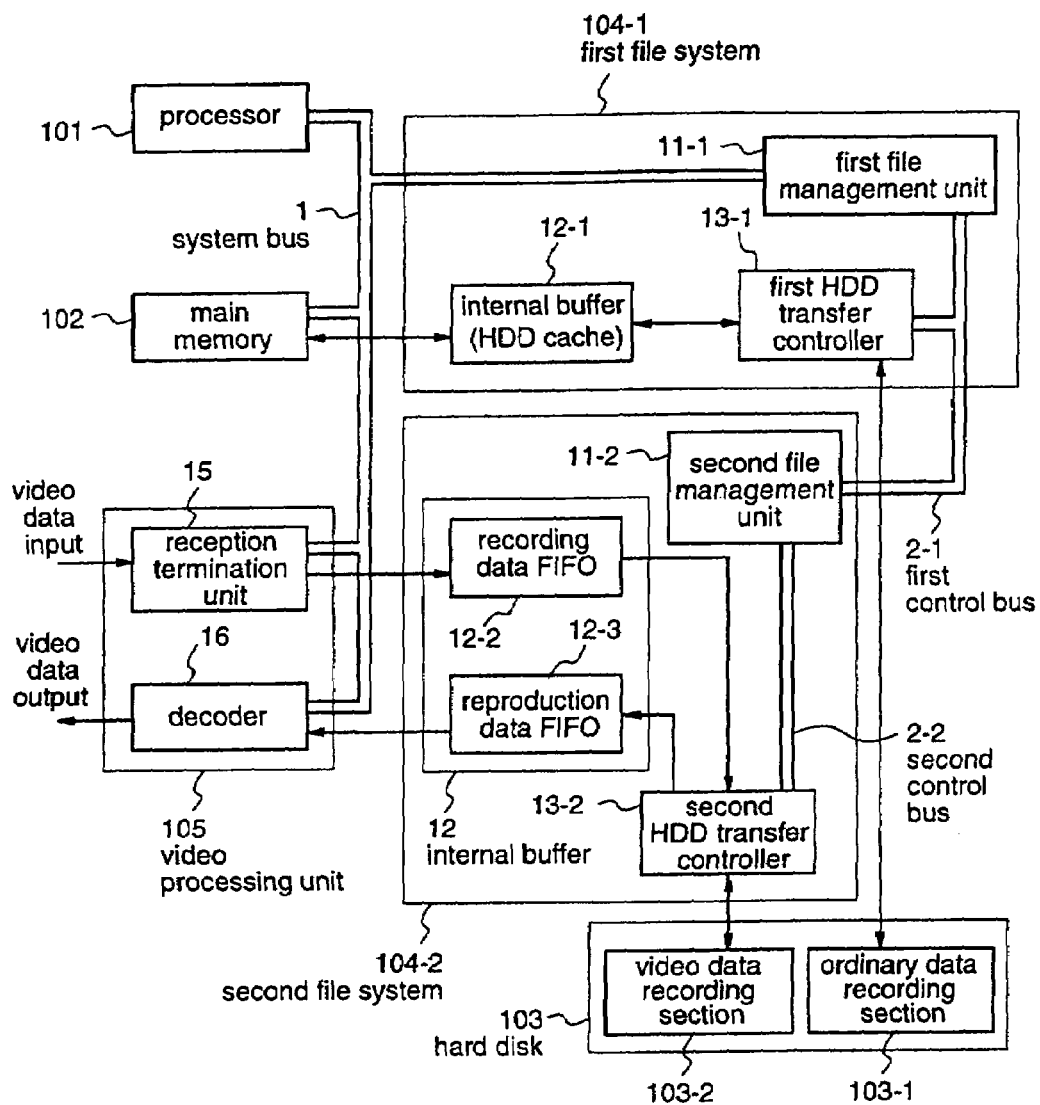
FIG. 3 is a block diagram of a recording and reproduction apparatus according to Prior Art 2.

FIG. 1 is a block diagram illustrating a recording and reproduction apparatus according to the first embodiment of the invention. In the figure, 101 denotes a processor for controlling the operation of the entire apparatus through a system bus 1, and performing random read/write access to a hard disk 103; 102 denotes a main memory as a working recording circuit for the processor 101; 103 denotes a hard disk for holding video data and the like, as a data recording circuit; 104 denotes a file system for managing a series of data on the hard disk 103 as a random-accessible data sequence, and controlling data transmission between the main memory 102 and the hard disk 103 or between a video processing unit 105 and the hard disk 103; and 105 denotes a video processing unit for processing input/output video data. Further, the video processing unit 105 comprises a reception termination unit 15, as a recording unit, for converting a video input into an internal recording format, and performing successive write access to the hard disk 103; and a decoder 16, as a reproduction unit, for performing successive read access to the hard disk 103, and creating a video output from the recorded data.

Next, a description will be given of the construction of the system file 104, which is a feature of the present invention.

The file system 104 comprises a file management unit 11 for executing the procedure for file management; an internal buffer 12 as a temporary storage area for data that is read from or written in the hard disk 103; an HDD transmission control unit 13 for executing data transmission between the internal buffer 12 and the hard disk 103; a selector 14 for selecting a buffer to be connected, for every type of access; and a control bus 2 connecting the respective constituents of the file system 104.

The internal buffer has independent buffer areas corresponding to the kinds of accesses to the hard disk 103, i.e., an HDD cache 12-1 for random access by the processor 101, a recording data FIFO 12-2 for recording data from the reception termination unit 15, and a reproduction data FIFO 12-3 for reproduction data to the decoder 16. The respective buffer areas have the characteristics as follows.

The HDD cache 12-1 holds a block of higher access frequency for longer time. Accordingly, even when the processor 101 makes random access to the hard disk 103, the probability of existence of the subject data in the HDD cache 12-1 becomes high, whereby the number of access times to the hard disk is reduced to improve the transmission efficiency.

On the other hand, the recording data FIFO 12-2 retains the video data from the reception termination unit 15 in the first-in first-out order, and the reproduction data FIFO 12-3 retains the input data to the decoder 16 in the first-in first-out order.

Next, a description will be given of the method for managing the data in the hard disk 103 by the file management unit 11 in the file system 104.

The file management unit 11 in the file system 104 manages a series of data on the hard disk 103 as a data sequence that is randomly accessible in byte units and is called a file, and controls data transmission between the main memory 101 and the hard disk 103 or between the video processing unit 105 and the hard disk 103.

Hereinafter, a description will be given of a file management system called "an i-node system" which is described in "Design and Mounting of UNIX4.3BSD" (translated by Akira Nakamura et al., Jun. 30, 1991, published by Maruzen), as an example of a file management system by the file management unit 11.

Figure 4:
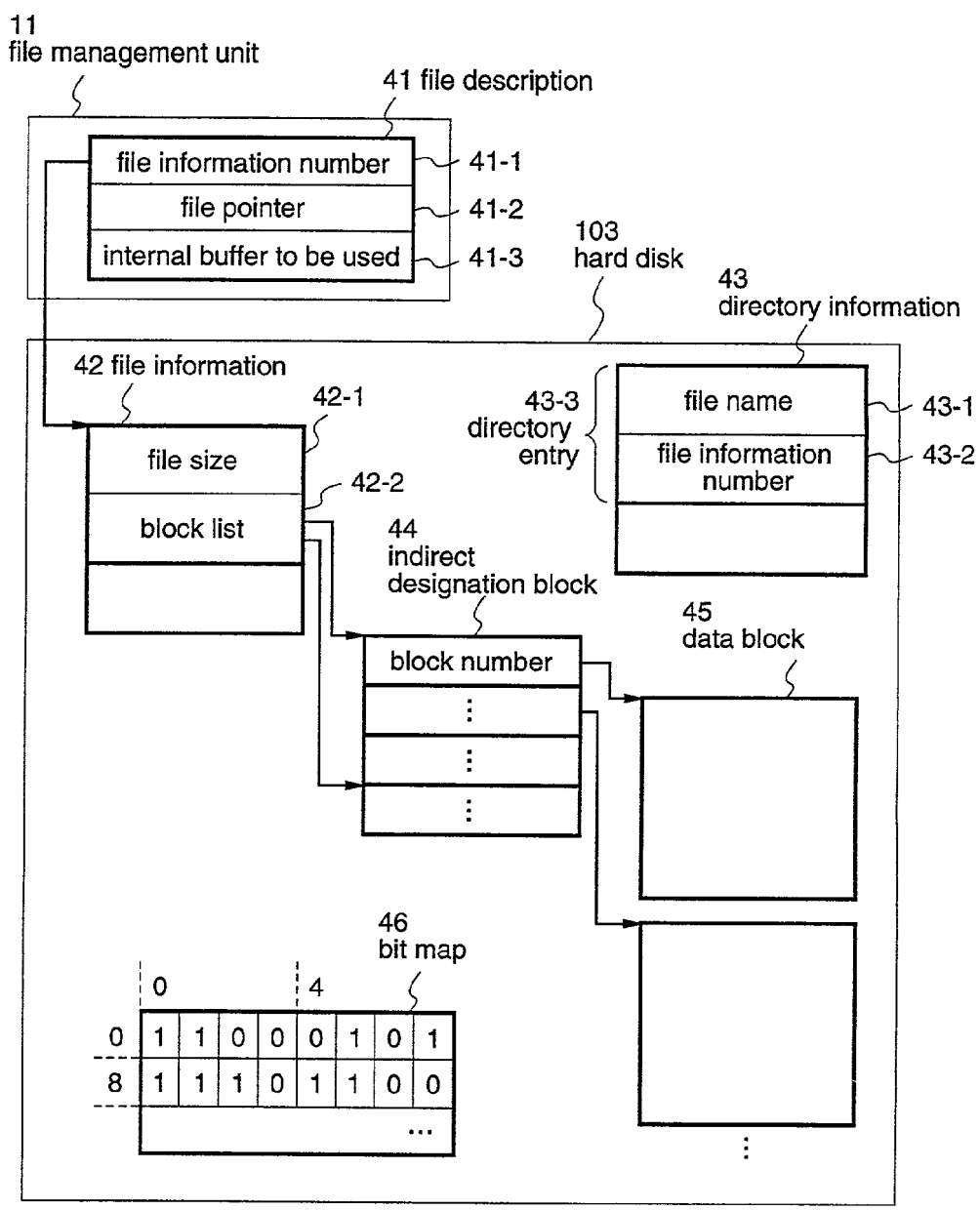
FIG. 4 is a diagram illustrating a data structure for managing a file of the recording and reproduction apparatus according to the first embodiment of the invention.

FIG. 4 is a diagram illustrating a data structure for managing a file on the hard disk 103 by the i node system. As shown in FIG. 4, five kinds of blocks, i.e., file information 42, directory information 43, an indirect designation block 44, a data block 45, and a bit map 46, are present on the hard disk 103.

The file information 42 is a block existing singly in each file, and the file information 42 has a file size 42-1 indicating the size of the file in byte units, and a block list 42-2 indicating the block numbers of data blocks 45 where the data of the file are actually stored.

The directory information 43 has a file name 43-1, and a file information number 43-2 as an index of the corresponding file information 42, and associates the file name with the file information 42.

Further, in the indirect designation block 44, the block numbers of the data blocks 45, where the data of the file are stored, are sequentially recorded, and the data to be recorded as the file are stored in the respective data blocks 45.

Further, each bit on the bit map 46 is associated with one block to manage the block, and unused blocks on the hard disk 103 are managed by setting the bit at 0 when the corresponding block is unused, and setting the bit at 1 when the corresponding block is used.

Further, the file management unit 11 of the file system 104 for managing the data in the hard disk 103, has a table called a file description 41 to control access to the file. The file description 41 has a file information number 41-1 indicating the file information 42 of a file to access, a file pointer 41-2 indicating a file position for read/write, and a use internal buffer 41-3 indicating an internal buffer 12 to be used when accessing the file.

Since the file description 41 exists for every access to the file, there may be cases where plural file descriptions 41 exist for one file. For example, when executing recording and reproduction of video at the same time, input video data is written in a file and, simultaneously, video data to be reproduced is read from the same file. At this time, a file description for write access and a file description for read access exist corresponding to one file.

In this way, the file management unit 11 in the file system 104 has the file description 41 that exists for each access to the file, and manages a series of data on the hard disk 103 as a random-accessible data sequence.

While in this first embodiment the i-node system is described as a file management system, the present invention is applicable to the case of managing a file using a file allocation table (FAT) that is employed in the operating system of Windows or the like.

Next, a description will be given of control of access to the hard disk 103 by the file system 104, with reference to FIGS. 5 through 9.

The file system 104 controls access to the hard disk 103, on the basis of a command from the processor 101 to the file system 104. FIG. 5 shows the format of the command from the processor 101 according to the first embodiment of the invention.

In FIG. 5, an OPEN command 510 is a command for notifying the file system 104 of an access method or the like in advance of use of a file. The OPEN command 510 indicates a file name 511 to access as a first argument, an access mode 512 such as read/write as a second argument, and a use internal buffer 513 as a third argument. On receipt of the OPEN command 510 from the processor 101, the file system 104 creates a file description 41 as shown in FIG. 4, and returns, as a return value, a file descriptor 514 as an index indicating the file description 41.

A READ command 520 is a command for making read access to the already opened file. When the file descriptor 514 indicating a file as a read target, a destination address 522 on the main memory 102 where the read file data is stored, and a size 523 indicating the number of bytes to be read are given to the file system 104 as the first, second, and third arguments, respectively, the file system 104 returns, as a return value, a transfer size 524 indicating the number of bytes actually read.

A WRITE command 530 is a command for making write access to the already opened file. When the file descriptor 514 indicating a file as a write target, the destination address 532 on the main memory 102 where the data to be written is stored, and a size 533 indicating the number of bytes to be written are given to the file system 104 as the first, second, and third arguments, respectively, the file system 104 returns, as a return value, the transfer size 534 indicating the number of bytes actually written.

Read/write to the file are executed on the file position indicated by the file pointer 41-2 in the file description 41 shown in FIG. 4. The file pointer 41-2 is initialized to zero when opening the file, and is incremented at every read/write access, by the size of the access.

A LSEEK command 540 is a command for moving the file pointer 41-2 of the already opened file to a designated position, and this command enables random access to the file. When the file descriptor 514 indicating a file whose file pointer is to be updated, and a new file pointer value 542 are given to the file system 104 as the first and second arguments, respectively, the file system 104 returns, as a return value, an updated file pointer value 544.

A CLOSE command 550 is used to notify the file system 104 of the file on which access has ended, and it releases the file description 41 indicated by the file descriptor 514 as the first argument.

Hereinafter, the process contents of the respective commands will be described in more detail. In the following description, the file information 42, the directory information 43, and the like are those in the file management data structure shown in FIG. 4.

Figure 6:
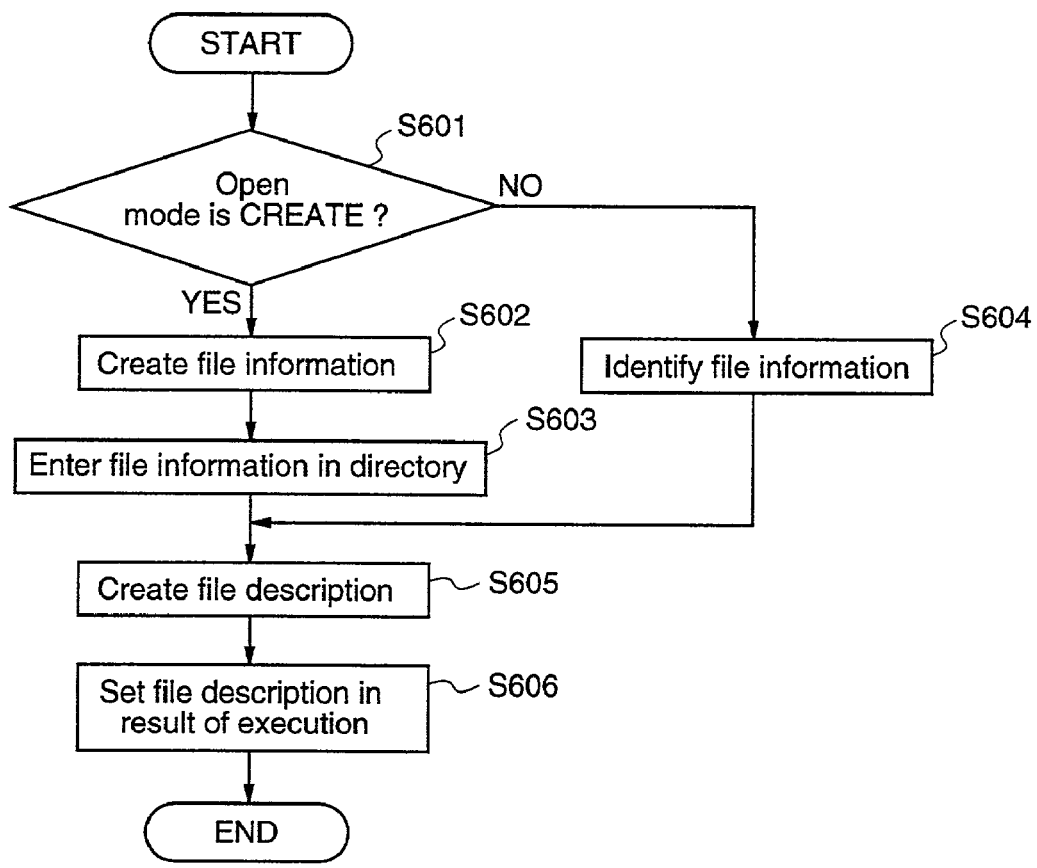
FIG. 6 is a flowchart illustrating an OPEN process of the recording and reproduction apparatus according to the first embodiment of the invention.

FIG. 6 is a flowchart illustrating the OPEN process. In this process, the file having the file name 511 indicated by the first argument in the OPEN command 510 shown in FIG. 5 is opened in the open mode 512 indicated by the second argument, and initialization for making access is performed using the use internal buffer 513 indicated by the third argument.

In the OPEN command process, initially, it is checked whether the open mode is CREATE or not (step 601). When CREATE is possible, the file size 42-1 in the file information 42 is initialized to zero, and the block list 42-2 is initialized to NULL, thereby creating new file information 42 (step 602).

Thereafter, the first argument 511 is set in the file name 43-1 in the directory entry 43-3, and the number of the created file information 42 is set in the file information number 43-2, whereby the newly created file information 42 is entered in the directory 43 (step 603).

When it is decided in step 601 that the open mode is not CREATE, the directory 43 is searched for a directory entry 43-3 whose file name 43-1 is identical to the first argument 511, and the file information 42 indicated by the file information number 43-2 in the selected directory entry 43-3 is obtained to identify the target file information from the existing file information 42 (step 604).

After the file information 42 is obtained in step 602 or step 604, the number of the file information 42 is set in the file information number 41-1, the file pointer 41-2 is initialized to zero, and the value of the third argument 513 is set in the use internal buffer 41-3, thereby creating the file description 41 (step 605). Thereafter, the file descriptor 514 corresponding to the created file description 41 is set in the result of execution (step 606) to end the process.

In the present invention, as shown in step 605, in the file description 41 that exists for every access to a file, the number of obtained file information 42 is set in the file information number 41-1, the file pointer 41-2 is initialized to zero, and the value of the third argument 513 is set in the use internal buffer 41-3. Therefore, even when plural accesses are made to the same file, the internal buffer to be used can be designated for each access by the OPEN command. That is, in the present invention, even when plural accesses are made to the same file, the internal buffer 12 to be used can be changed for each access. For example, when recording video data on a file, the recording data FIFO 12-2 is used as the internal buffer 12, and when editing the video data in the file simultaneously with the recording, the HDD cache 12-1 can be used as the internal buffer 12 simultaneously with the recording data FIFO 12-2.

Figure 7:
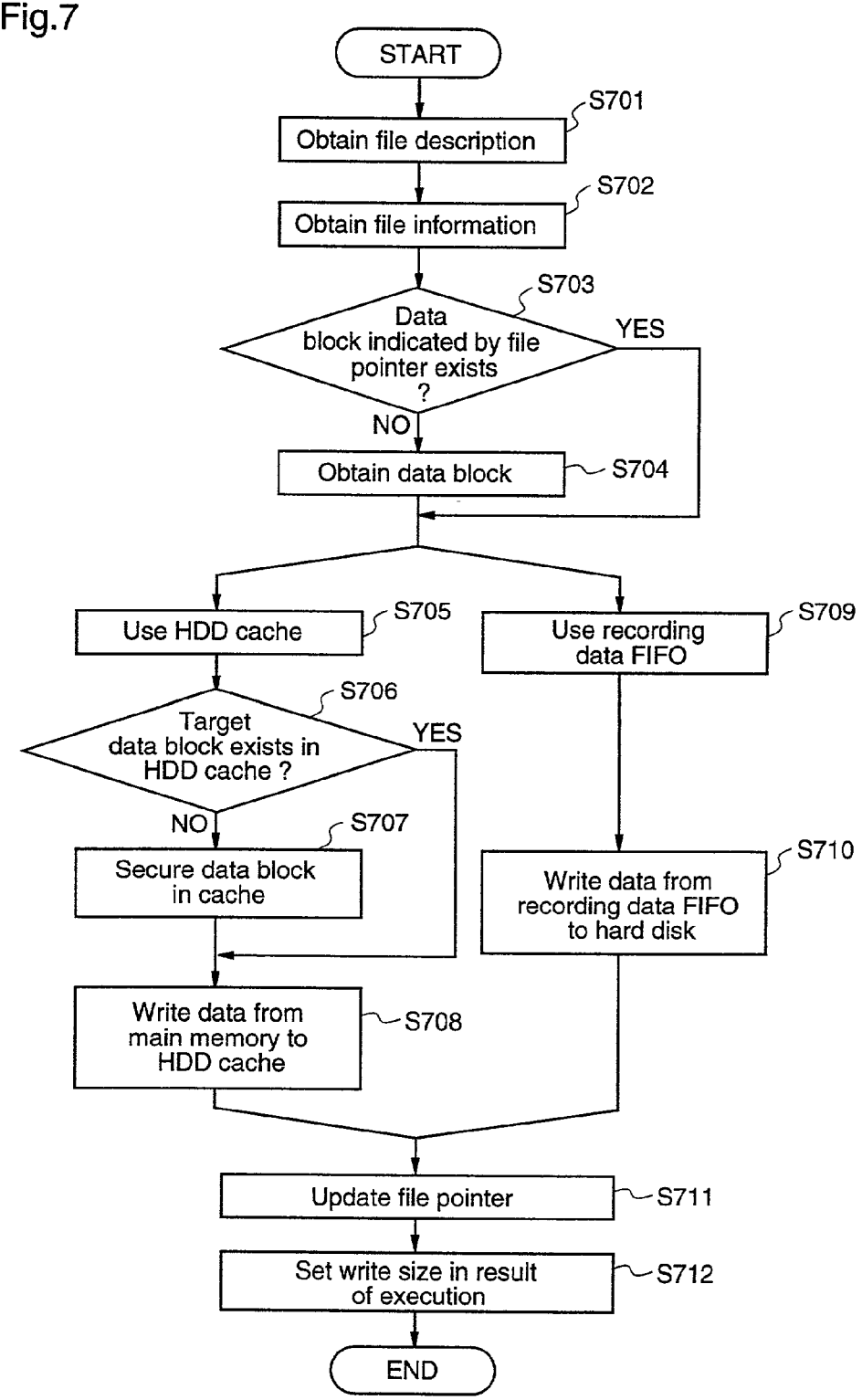
FIG. 7 is a flowchart illustrating a WRITE process of the recording and reproduction apparatus according to the first embodiment of the invention.

FIG. 7 is a flowchart illustrating the WRITE process. In this process, using the access method indicated by the file descriptor 514 that is the first argument in the WRITE command 530, the data equivalent to the transfer size 533 indicated by the third argument is written from the source address 532 indicated by the second argument to the hard disk 103.

In the WRITE process, initially, the file description indicated by the first argument 514 is obtained (step 701), and the file information 42 indicated by the file information number 41-1 in the file description 41 is obtained (step 702). Next, it is checked whether a data block 45 as a write target, which is indicated by the file pointer 41-2, exists or not (step 703), and when no data block 45 as a write target exists, a new data block 45 is obtained (step 704).

Thereafter, the WRITE process is divided into branch processes as follows: the process by the HDD cache 12-1 that is the internal buffer 12 indicated by the use internal buffer 41-3 in the obtained file description 41 (step 705), and the process by the recording data FIFO 12-2 (step 709).

When the use internal buffer 41-3 is the HDD cache 12-1, the HDD cache 12-1 is searched for a data block 45 as a write target (step 706). When there is no target block as a write target, a data block is obtained from a new cache (step 707). Thereafter, the data equivalent to the size indicated by the third argument 533 is written in this cache from the address on the main memory indicated by the second argument 532 (step 708).

When the use internal buffer 41-3 is the recording data FIFO 12-2, the data equivalent to the size indicated by the third argument 533 from the head data in the recording data FIFO 12-2 is written in the hard disk 103 (step 710). At this time, the actual writing into the hard disk 103 is executed by the HDD transfer controller 13 on the basis of an instruction from the file management unit 11.

In the WRITE process, only transfer of data on the main memory 101 to the data block of the cache is executed, and data transfer from the data block of the cache to the hard disk 103 is executed in the CLOSE process which will be described later. Thereby, unnecessary write access to the hard disk 103 is avoided, and the write access efficiency is improved.

When step 708 or step 710 is completed, the file pointer 41-2 in the file description 41 is incremented by the size of the written data (step 711), and the size of the written data is set in the result of execution (step 712) to end the process.

Figure 8:
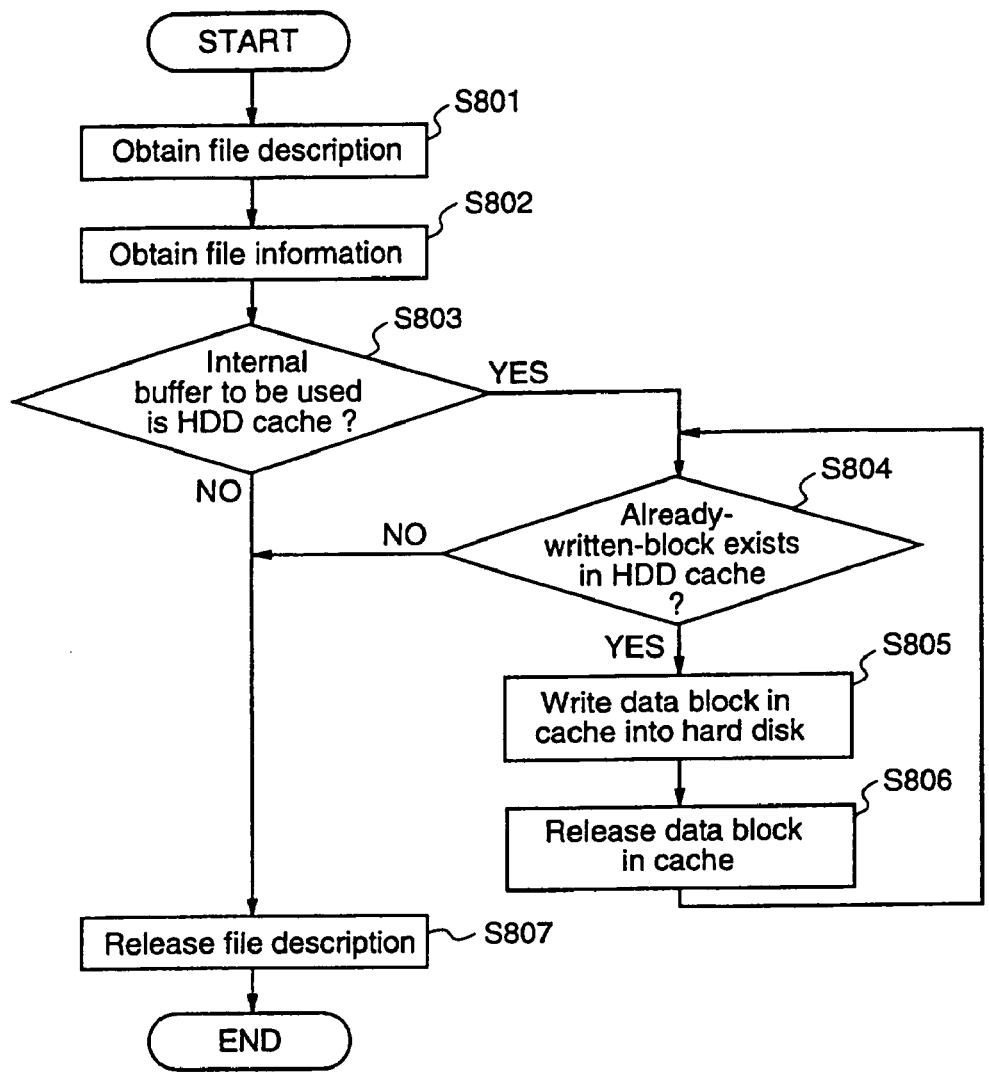
FIG. 8 is a flowchart illustrating a CLOSE process of the recording and reproduction apparatus according to the first embodiment of the invention.

FIG. 8 is a flowchart illustrating the CLOSE process. In this process, the file description 41 indicated by the first argument 514 in the CLOSE command 550 is released. In the CLOSE process, initially, the file description 41 indicated by the first argument 514 is obtained (step 801), and the file information 42 indicated by the file information number 41-1 in the file description 41 is obtained (step 802).

Next, it is checked whether the use internal buffer 41-3 indicated in the file description 41 is the HDD cache 12-1 or not (step 803). When it is the HDD cache 12-1, it is checked whether or not the data block of the cache which is written in the step 708 of the WRITE process exists in the HDD cache 12-1 or not (step 804). When such data block exists, the data block of the already written cache is written in the hard disk 103 (step 805), and the data block of the cache is released (step 806). Steps 804, 805, and 806 are continued until the data blocks of the already written cache are gone.

When the use internal buffer 41-3 is not the HDD cache 12-1 or when the data blocks of the already written cache are gone, the file description 41 is released (step 807) to end the process.

Figure 9:
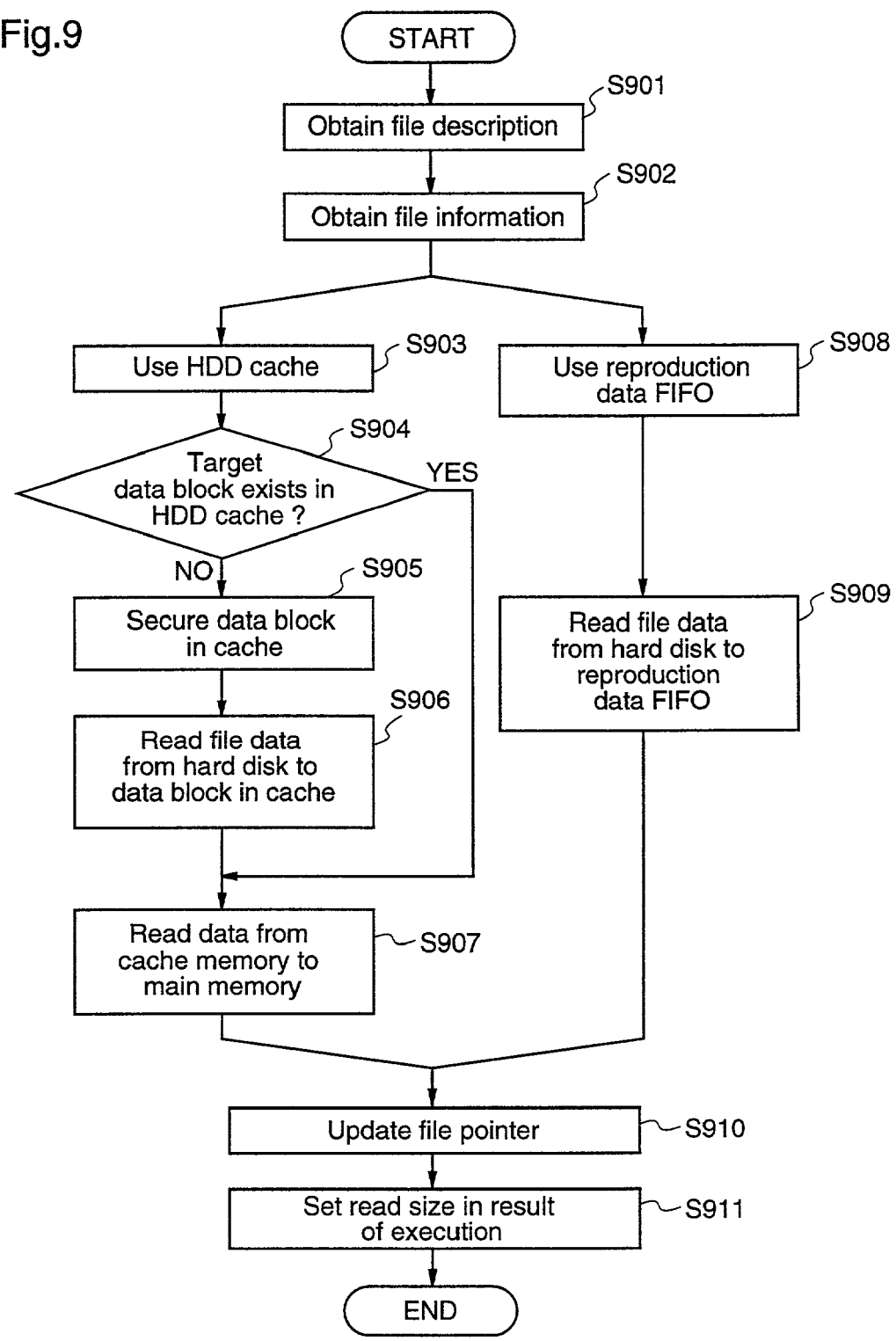
FIG. 9 is a flowchart illustrating the READ process of the recording and reproduction apparatus according to the first embodiment of the invention.

FIG. 9 is a flowchart illustrating the READ process. In this process, using the access method indicated by the file identifier 514 as the first argument in the READ command 520, the data equivalent to the transfer size 523 indicated by the third argument is read from the hard disk 103 to the destination address 522 indicated by the second argument.

In the READ process, initially, the file description indicated by the first argument 514 is obtained (step 901), and the file information 42 indicated by the file information number 41-1 in the file description 41 is obtained (step 902). Next, the READ process is divided into the following branch processes: the process by the HDD cache 12-1 that is the internal buffer 12 indicated by the use internal buffer 41-3 in the obtained file description 41 (step 903), and the process by the reproduction data FIFO 12-3 (step 908).

When the internal buffer is the HDD cache 12-1, it is checked whether the data block 45 as a read target exists in the HDD cache 12-1 or not (step 904). When no read target block exists, a data block of a new cache is obtained (step 905), and the data block 45 on the hard disk 103 is read in the data block of this cache (step 906). Thereafter, the data in the data block in this cache is read to the address on the main memory 102 indicated by the second argument 522 by the size designated by the third argument 523 (step 907). When a read target block exists in the HDD cache 12-1 in step 904, access to the hard disk 103 (steps 905 and 906) becomes unnecessary, and only read access to the data block of the corresponding cache (step 907) is carried out, resulting in high-speed reading.

When the internal buffer 12 is the reproduction data FIFO 12-3, the data equivalent to the size designated by the third argument 523 is read from the data on the hard disk 103 indicated by the file pointer 41-2, to the end part of the reproduction data FIFO 12-3 (step 909). At this time, actual reading from the hard disk 103 is executed by the HDD transfer control unit 13 on the basis of an instruction from the file management unit 11.

When the data reading in step 907 or step 909 is ended, the file pointer 41-2 is incremented by the size of the read data (step 910), and the size of the read data is set in the result of execution (step 911) to end the process.

Next, the LSEEK process will be described. In this process, with respect to the file indicated by the file descriptor 514 as the first argument in the LSEEK command, the access position to the file (i.e., the value of the file pointer 41-2) is set in the file pointer value 542 indicated by the second argument.

In the LSEEK process, initially, the file description indicated by the first argument 514 is obtained, the value indicated by the second argument 542 is set in the file pointer 41-2 in the file description 41, and the updated file pointer value is set in the result of execution to end the process.

Although, in the first embodiment shown in FIG. 1, the file system 104 is implemented as one functional block, the present invention is also applicable to the case where the file system 104 is implemented as software on the processor 101.

As described above, in the present invention, an independent buffer area is provided for each type of access to the hard disk 103, and each buffer is used for the corresponding access. Therefore, the access by the processor 101 and the access by the video processing unit 105 are performed without sharing an internal buffer, whereby continuity of accesses to video data can be secured.

Further, since the internal buffer to be used is not fixed for each file, but specified for each access to the file by the processor 101, the processor 101 can randomly access a file in which video data has already been recorded or a file in which video data is being recorded.

Although, in the recording and reproduction apparatus according to the first embodiment of the invention, the processing units that process the data on the hard disk 103 are the processor 101, the reception termination unit 15 as a recording unit, and the decoder 16 as the reproduction unit, the processing units are not restricted to these, and the present invention can also be applied to other processing units that access the hard disk.

Further, in the recording and reproduction apparatus according to the first embodiment of the invention, the processor 101 performs random access in the read/write mode to the hard disk 103, the reception termination unit 15 as the recording unit performs sequential access in the write mode to the hard disk 103, and the decoder 16 as the reproduction unit performs sequential access in the read mode to the hard disk 103, and the recording and reproduction apparatus has an internal buffer for each of these accesses. However, the present invention is not restricted thereto, and the recording and reproduction apparatus may have an internal buffer for each access from a processing unit. For example, the apparatus may have an internal buffer for each of sequential read access, write access, and read/write access, which are executed by a single processing unit.

APPLICABILITY IN INDUSTRY

As described above, according to a recording and reproduction apparatus of the present invention, an independent internal buffer area is provided for each of plural kinds of accesses to a hard disk, and each internal buffer is used for the corresponding access, whereby that access by the processor and access by the video processing unit share an internal buffer is avoided. Therefore, the access to ordinary data does not adversely affect the access to video data, whereby the continuity of the accesses to video data is ensured. Further, an internal buffer to be used is not fixed for each file, but specified for each access to a file, whereby the processor can randomly access a file in which video data has already been recorded or a file in which video data is being recorded.

According to the present invention, the continuity of the accesses to the hard disk for recording and reproduction can be secured, and the processor can randomly access already recorded video data during data recording.

The invention claimed is:

1. A recording and reproduction apparatus comprising:
   a hard disk for holding data;
   a file system for controlling recording of data into the hard disk and reproduction of data from the hard disk; and
   a plurality of processors for performing accesses to the data in the hard disk, wherein
   the file system includes a plurality of internal buffers for temporarily holding data transferred between the plurality of processors and the hard disk, the plurality of internal buffers being for respective kinds of accesses to a same file executed at a same time between the plurality of processors and the hard disk,
   the plurality of internal buffers includes a buffer for random access, a buffer for recording, and a buffer for reproduction, and
   the buffer for random access is operable to be accessed in random order simultaneously with one of the buffer for recording and the buffer for reproduction, both of which are operable to be accessed in sequential order, when different kinds of accesses to the same file are performed.

2. A recording and reproduction apparatus as defined in claim 1, wherein each of the accesses executed between the plurality of processors and the hard disk is one of a sequential read access, a random read access, a write access, and a read/write access.

3. A recording and reproduction apparatus as defined in claim 1, wherein the processors include:
   a recording unit for generating digital video to be recorded, and performing sequential write access to the hard disk;
   a reproduction unit for performing sequential read access to the hard disk, and restoring digital video from recorded data; and
   a processor for controlling the entire recording and reproduction apparatus, and performing random read/write access to the hard disk.

4. A recording and reproduction apparatus as defined in claim 1, wherein the file system includes a selector for selecting an internal buffer of the plurality of internal buffers to be used for every kind of access, in advance of use of the hard disk.

5. A recording and reproduction apparatus as defined in claim 2, wherein the file system includes a selector for selecting an internal buffer of the plurality of internal buffers to be used for every kind of access, in advance of use of the hard disk.

6. A recording and reproduction apparatus as defined in claim 3, wherein the file system includes a selector for selecting an internal buffer of the plurality of internal buffers to be used for every kind of access, in advance of use of the hard disk.

* * * * *